United States Patent
Uszynski

(10) Patent No.: US 9,950,725 B2
(45) Date of Patent: Apr. 24, 2018

(54) REVERSIBLE TABLE AND CART

(71) Applicant: Roman Uszynski, Southfields, NY (US)

(72) Inventor: Roman Uszynski, Southfields, NY (US)

(*) Notice: Subject to any disclaimer, the term of this patent is extended or adjusted under 35 U.S.C. 154(b) by 63 days.

(21) Appl. No.: 14/933,429

(22) Filed: Nov. 5, 2015

(65) Prior Publication Data
US 2017/0129519 A1    May 11, 2017

(51) Int. Cl.
B62B 3/02 (2006.01)

(52) U.S. Cl.
CPC ..................... B62B 3/02 (2013.01)

(58) Field of Classification Search
None
See application file for complete search history.

(56) References Cited

U.S. PATENT DOCUMENTS

| | | | | |
|---|---|---|---|---|
| 3,689,098 A * | 9/1972 | Rubin | ........... | B62B 3/005 280/33.998 |
| 6,758,482 B2 * | 7/2004 | Stallbaumer | ........... | B62B 1/125 280/47.18 |
| 6,837,501 B1 * | 1/2005 | Hedrick | ........... | B62B 1/002 144/286.1 |
| 6,886,836 B1 * | 5/2005 | Wise | ........... | B25H 1/04 280/30 |
| 7,464,956 B2 * | 12/2008 | Chen | ........... | B25H 1/04 280/30 |
| 7,963,530 B1 * | 6/2011 | Garcia | ........... | B62B 3/02 280/28 |
| 7,971,898 B2 * | 7/2011 | Wise | ........... | B25H 1/04 108/79 |
| 2002/0017766 A1 * | 2/2002 | Thompson | ........... | A45C 5/14 280/30 |
| 2006/0119056 A1 * | 6/2006 | Olsen | ........... | A47B 3/10 280/30 |
| 2008/0018078 A1 * | 1/2008 | Van Landingham, Jr. | ........... | B62B 3/02 280/651 |
| 2012/0018966 A1 * | 1/2012 | Moore | ........... | B62B 3/002 280/79.11 |

* cited by examiner

Primary Examiner — John D Walters
Assistant Examiner — Hilary L Johns
(74) Attorney, Agent, or Firm — Michael J. Feigin, Esq.; Feigin and Fridman

(57) ABSTRACT

A reversible cart with wheels is disclosed which can be flipped from one orientation with wheels down and handles pointed upwards, to another orientation with the wheels and handles both pointed downwards (relative to the ground). In the latter embodiment, the cart functions as a table. To accomplish this, portals extend through the cart/table, at least some of which are equidistantly spaced from others, and two support beams of a handle or handles are inserted into two successive portals. The portals can be on narrow and long sides of a rectangular cart/table, allowing the handles to be inserted in various configurations, such as only on the narrow side, on both narrow sides, or on the long side. The cart/table itself can have two sides spaced apart by ribbing, creating a shelf there-between.

19 Claims, 7 Drawing Sheets

REVERSIBLE TABLE AND CART

FIELD OF THE DISCLOSED TECHNOLOGY

The disclosed technology relates generally to carts and, more specifically, to those with removable handles.

SUMMARY OF THE DISCLOSED TECHNOLOGY

An embodiment of a single device which can be a cart or table includes two spaced-apart parallel surfaces, ribbing between the two spaced-apart parallel surfaces, hollow pipes extending between the two spaced-apart parallel surfaces at least substantially at each corner of each of the two spaced-apart parallel surfaces, and wheels attached to one of the two spaced-apart parallel surfaces. A plurality of portals extends through the two spaced-apart parallel surfaces, each portal of the plurality of portals aligned with a pipe of the hollow pipes. At least one handle with a cross-beam and two parallel support beams are used. The handle or handles have two parallel support beams spaced apart at a distance equal to that of two portals of the plurality of portals. The support beams pass through two portals.

The two spaced-apart parallel surfaces are rectangles of equal length and width to each other, in embodiments of the disclosed technology. The plurality of portals extending through the two spaced-apart parallel surfaces is substantially at each corner of each rectangle, and an additional two portals of the plurality thereof are substantially along a longest length of the rectangle and are spaced apart from the corners.

In embodiments, two handles are used. Each handle has two support beams passing through a portal of the plurality of portals substantially at a corner of each rectangle. At least one handle can be two handles oriented in a same direction to one another, and each of the two parallel support beams of each two handles can pass through a portal of the plurality of portals substantially at a corner of each corner of each rectangle. Wheels, in embodiments, are attached to one of the two spaced-apart parallel surfaces on a side opposite an adjacent side situated between the two spaced-apart parallel surfaces. In an embodiment, two parallel support beams of the at least one handle extend from one of the spaced-apart parallel surfaces where the wheels are attached, and the cross-beam is parallel to the two spaced-apart parallel surfaces.

The two parallel support beams of the at least one handle, in embodiments, extend from one of the two spaced-apart parallel surfaces facing the wheels, and the cross-beam is parallel to the two spaced-apart parallel surfaces. An elongated additional portal extends through each of the two spaced-apart parallel surfaces, in embodiments, wherein both of the two spaced-apart parallel surfaces are of equal length and width, and each elongated additional portal is centered along the length and at an opposite side along the width, with respect to one another.

A kit of embodiments of the disclosed technology, such as, or in addition to, the above embodiments, has a top rectangular member, a bottom rectangular member, and a handle. The top rectangular member and the bottom rectangular member are fixedly spaced apart and in parallel to one another, and at least one said rectangular member has a plurality of spaced-apart portals at each corner. A distance along a shorter side of the at least one rectangular member between two of the plurality of spaced-apart portals is equal to the distance from at least two portals of the plurality thereof at a corner to at least two additional portals of the plurality of portals at non-corners. At least one rigidly formed handle having spaced-apart supports, spaced apart equal to the distance, such that the spaced-apart supports of the handle, are insertable into two portals of the plurality of spaced-apart portals in at least four different ways.

Both the top rectangular member and the bottom rectangular member include the plurality of spaced-apart portals, such that spaced-apart supports are insertable into two portals of the plurality of spaced-apart portals in at least eight ways: four of the at least eight ways being in an opposite direction through the portals compared to another four of said at least eight ways. The spaced-apart portals can extend through the top rectangular member and the bottom rectangular member.

Hollow pipes can surround an area between each two sets of corresponding portals of the top rectangular member and the bottom rectangular member. A wheel can be attached at each corner of the bottom rectangular member, each closer to a corner of the bottom rectangular member than a portal of the plurality of spaced-apart portals at each corner.

In the above or other embodiments, a multi-configurable desk and cart has six portals which are each grouped in portals of three and spaced apart from at least one other portal at a first distance, each portal of the six portals passing through two spaced-apart elongated and generally flat members. A tube is positioned between each of the two spaced-apart elongated and generally flat members. At least a first handle with a cross-beam and two spaced-apart support beams has ends spaced apart at said first distance, and each end is removably insertable into one of the six portals.

The ends of the support beams of the first or a second handle are inserted into a first set of two adjacent portals, such as at a first shorter side of the generally flat members, and a second set of two adjacent portals at a second shorter side of the generally flat members—such that the first handle and the second handle are parallel to one another, The first handle is insertable into a first set of two adjacent portals in four different ways, each of the four different ways being 180 degrees rotated or flipped from one another.

At least one handle can be two identical handles placed into four of the six portals, such that an identical portal cannot be placed into a remaining two of the six portals.

Embodiments described with reference to the device of the disclosed technology are equally applicable to methods of use thereof.

"Substantially" and "substantially shown," for purposes of this specification, are defined as "at least 90%," or as otherwise indicated. Any device may "comprise" or "consist of" the devices mentioned there-in, as limited by the claims. "Generally" is defined as the same as "substantially" or "what one of ordinary skill in the art would colloquially refer to as such."

It should be understood that the use of "and/or" is defined inclusively such that the term "a and/or b" should be read to include the sets: "a and b," "a or b," "a," "b."

DETAILED DESCRIPTION OF EMBODIMENTS OF THE DISCLOSED TECHNOLOGY

A reversible cart with wheels is disclosed which can be flipped from one orientation with wheels down and handles pointed upwards, to another orientation with the wheels and handles both pointed downwards (relative to the ground). In the latter embodiment, the cart functions as a table. To accomplish this, portals extend through the cart/table, at least some of which are equidistantly spaced from others, and two support beams of a handle or handles are inserted into two successive portals. The portals can be on narrow and long sides of a rectangular cart/table, allowing the handles to be inserted in various configurations, such as only on the narrow side, on both narrow sides, or on the long side. The cart/table itself can have two sides spaced apart by ribbing, creating a shelf there-between.

Embodiments of the disclosed technology will become clearer in view of the following description of the drawings.

Figure 1:
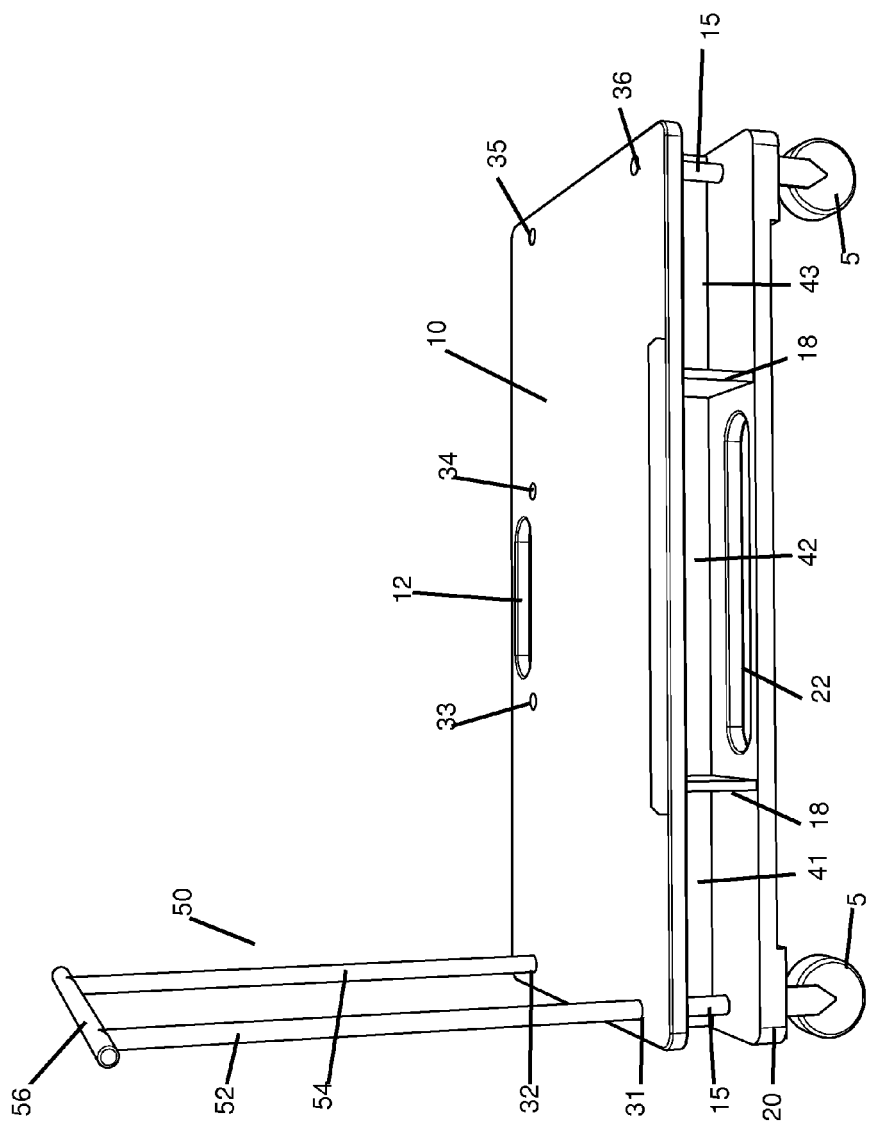
FIG. 1 shows a cart of an embodiment of the disclosed technology.

FIG. 1 shows a cart of an embodiment of the disclosed technology. The cart has an upper parallel surface 10 and lower parallel surface 20. For purposes of this disclosure, "lower" refers to the side where the wheels 5 are attached or the side of the generally flat and parallel surfaces which is closest to the ground in use/when used as intended. The intended use is such that the wheels extend from the lower surface 20 towards the ground, such that when used as a table (see FIG. 7) the wheels are on the bottom side of the table, or, when used as a cart, the wheels are between the surface 20 and the ground.

The upper 10 and lower 20 parts of the generally flat surfaces are spaced apart by ribbing 18 and pipes 15 which are hollow, in embodiments of the disclosed technology. This forms a shelf or sections of shelf 41 (between one end and a first rib), 42 (a central shelf with ribbing on both sides), and 43 (between the other end and a second rib). Further, the upper surface 10 can have an elongated and/or ovoid portal 12 extending there-through, while the lower surface 20 can have a longer elongated and/or ovoid portal 22 situated between ribbing 18 on either side.

A plurality of portals extends through the upper generally flat member 10, including portals 31, 32, 35, and 36 at each corner. For purposes of this disclosure, "at a corner" is defined as "within 10% of a distance from a meeting point or general meeting point of three sides to a longest distance from the meeting point to a center point of one of the sides." Here, "sides" refers to what are generally recognized in the art as sides, meaning, a top side, longer edge, and shorter edge of, for example, a rectangle or rounded rectangle with depth, irrespective of the exact pointed nature or rounded nature of the corner.

Additional portals 33 and 34 are situated on, and pass through, the surface 10. These additional portals are spaced from a corner portal in the same amount/the same distance as between two corner portals, in embodiments of the disclosed technology. For example, portals 34 and 35 are spaced apart the same distance as portals 35 and 36 are spaced from each other. Portals 33 and 34 are on or generally on/along (closest to) an elongated side of the surface 10 and can be spaced from other less than or equal to that of the spacing of other adjacent portals.

The pipes 15, in embodiments of the disclosed technology, provide one or both of support between the two spaced-apart generally flat members 10 and 20, as well as a place for passage through the corner portals 31, 32, 35, and/or 36, as well as the elongated side portals 33 and 34. The wheels 5 are closer to the actual corners than the portals, in an embodiment of the disclosed technology. A handle, such as handle 50 shown in FIG. 1, can be inserted through a portal by way of one of its support members, such as support member 52 or 54. The support members of the handle are spaced apart equal to the spacing of the portals which they enter, such as the spacing between two adjacent portals 31/32, 32/33, 35/35, and 35/36.

Discussing the handle in more detail, a handle 50 has two support members 52 and 54 which are parallel to one another and are fixedly or removably attached to a cross-beam 54 at a right angle. Other angles of connection can be used, as long as the ends of each support member (furthest from the adjoining beam or place where the support members join) are spaced the same as the distance between two adjacent portals. In this manner, the cross-beam 56, when the device is in a cart configuration, functions as a point to grasp and push or pull the cart, and the support beams 52 and 54 pass through adjacent portals to engage the cart and cause the cart to move with the handle 50. In order to prevent the handle 50 and the support beams 52 and 54 from falling too far through the portals, the support beams can have a wider portion which cannot fit through the portals; a clip can be used which passes around or through one or two of the support beams, preventing passage of the beam through a portal beyond a specific point, or a clamp can be employed around a support beam. Any other mechanism known in the art to prevent one item from passing too far through another can be used.

In the embodiment shown in FIG. 1, the support beams 52 and 54 are shown inserted through the top side of the upper generally flat side 10 through adjacent portals 31 and 32, and passing through at least one hollow pipe 15. The handle is then functional on the shorter side of the rectangular cart.

Figure 2:
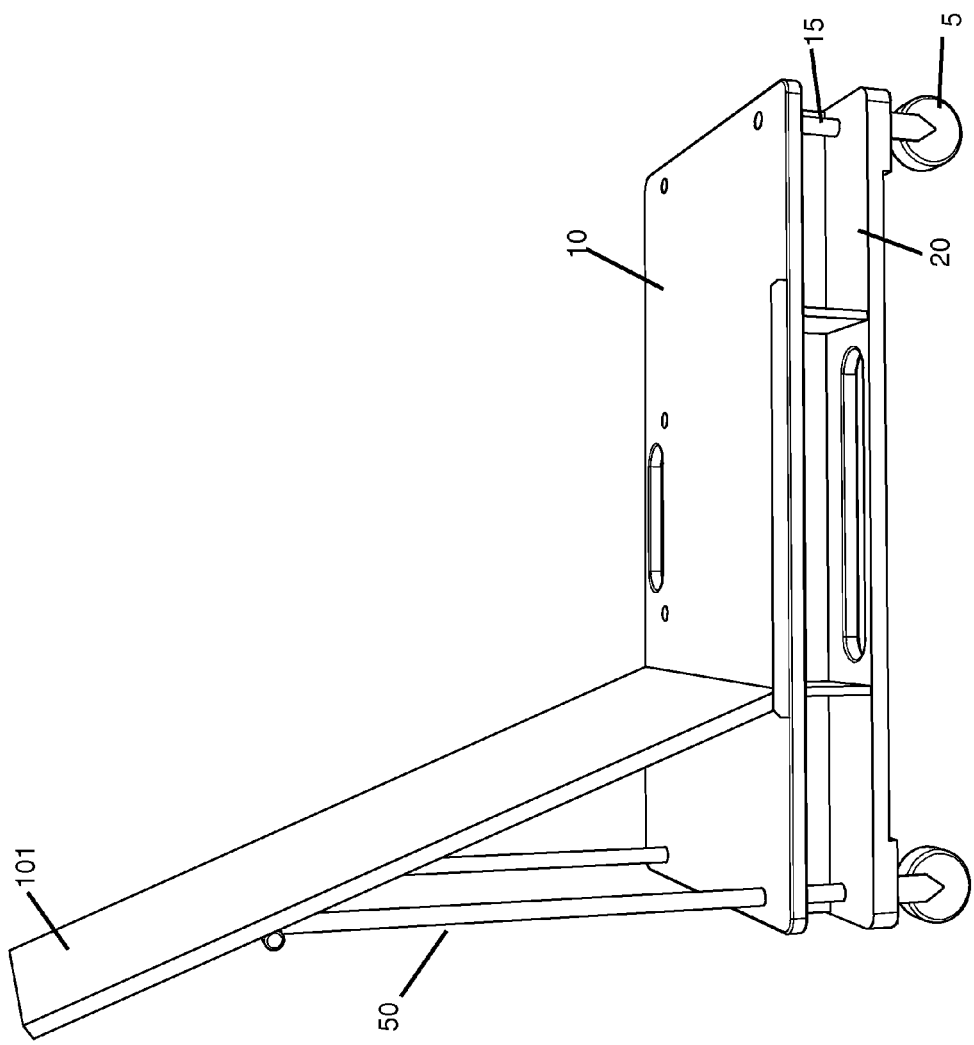
FIG. 2 shows the cart of FIG. 1 holding an item against a handle of the cart.

FIG. 2 shows the cart of FIG. 1 holding an item against a handle of the cart. Here, item 101 rests both on the upper surface of the upper generally flat member 10 and against the handle 50 and its cross-beam 56.

Figure 3:
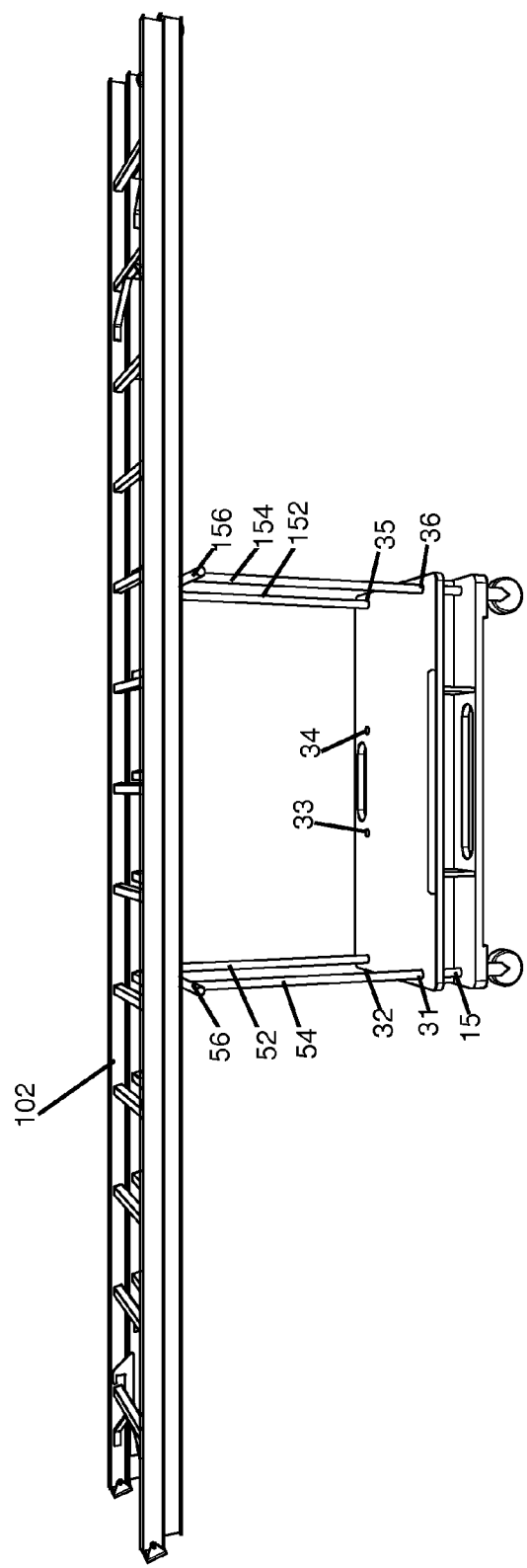
FIG. 3 shows a cart of an embodiment of the disclosed technology, with two handles in parallel and a ladder across the handles.

FIG. 3 shows a cart of an embodiment of the disclosed technology with two handles in parallel and a ladder across the handles. In this embodiment, two identical handles are used. Elements of handle 50 are incremented by 100 for the handle having a cross-beam 156 with support beams 152 and 156. One handle is placed through corner portals 31 and 32, while another handle is placed through the opposite corner portals 35 and 36, such that the handles extend across each narrower side of the cart. This creates a cart with handles on either side. The same configuration, but with the handles flipped 180 degrees, so that they enter through the bottom side, is used to convert the cart into a desk with legs on either side. A ladder 102 is shown extending across the cross-beams 56 and 156 of the handles which are spaced apart and oppositely disposed.

Figure 4:
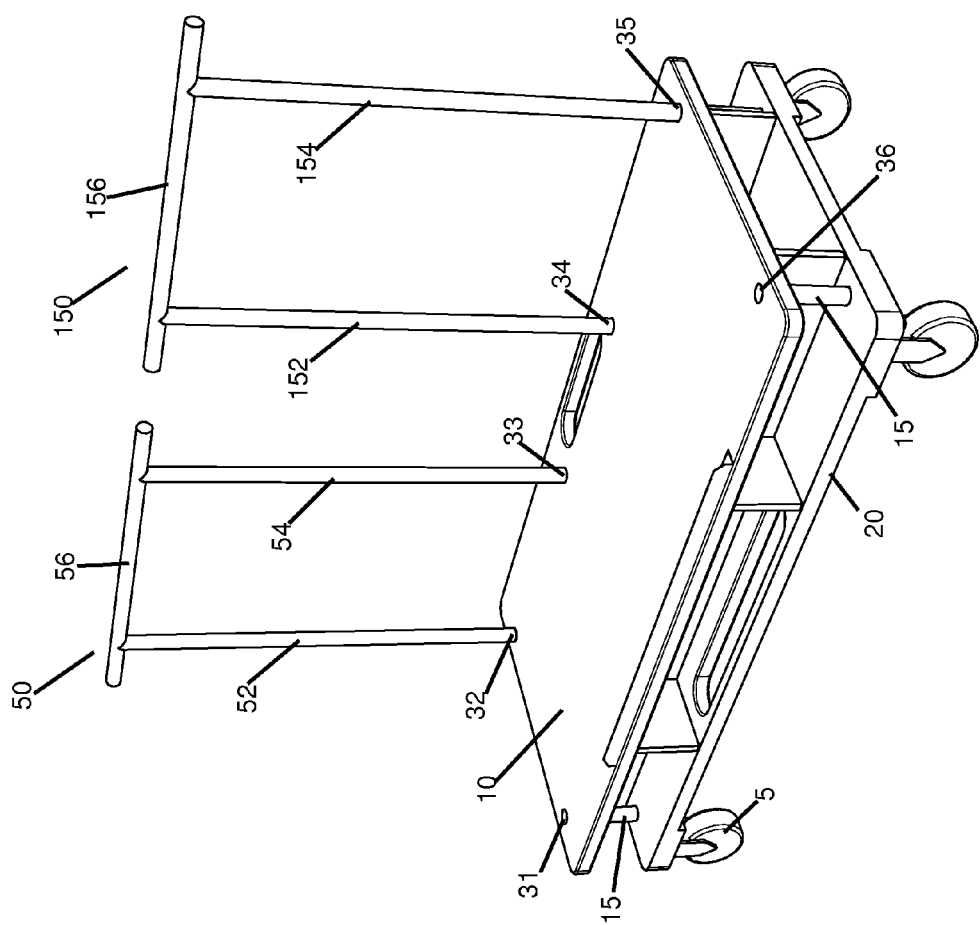
FIG. 4 shows a cart of an embodiment of the disclosed technology with two handles on the same side of the cart.

FIG. 4 shows a cart of an embodiment of the disclosed technology with two handles on the same side of the cart. Here, the handles 50 and 150 are placed in the same orientation on the longest side of the cart and top member 10. The handles have cross-beams 46 and 156, which are wider than their support members 52 and 54; and 152 and 154. This creates a pi shape handle with the cross-beams 56 and 156 of the two handles closer together than the closest support beams 54 and 152. The handles, in this configuration/embodiment, are placed through a corner portal and a side portal of the elongated side. Handle 50 is placed through corner portal 32 and side portal 33, while handle 150 is placed through corner portal 35 and side portal 34. Thus, when using two handles, the handles can be arranged so that the cross-beams are in line with one another (as in FIG. 4) or parallel to one another (as in FIG. 3). In embodiments, only two identical handles can be used at a time, because four of the portals are filled by the two handles, and other identical handles cannot enter the remaining two unused portals.

Figure 5:
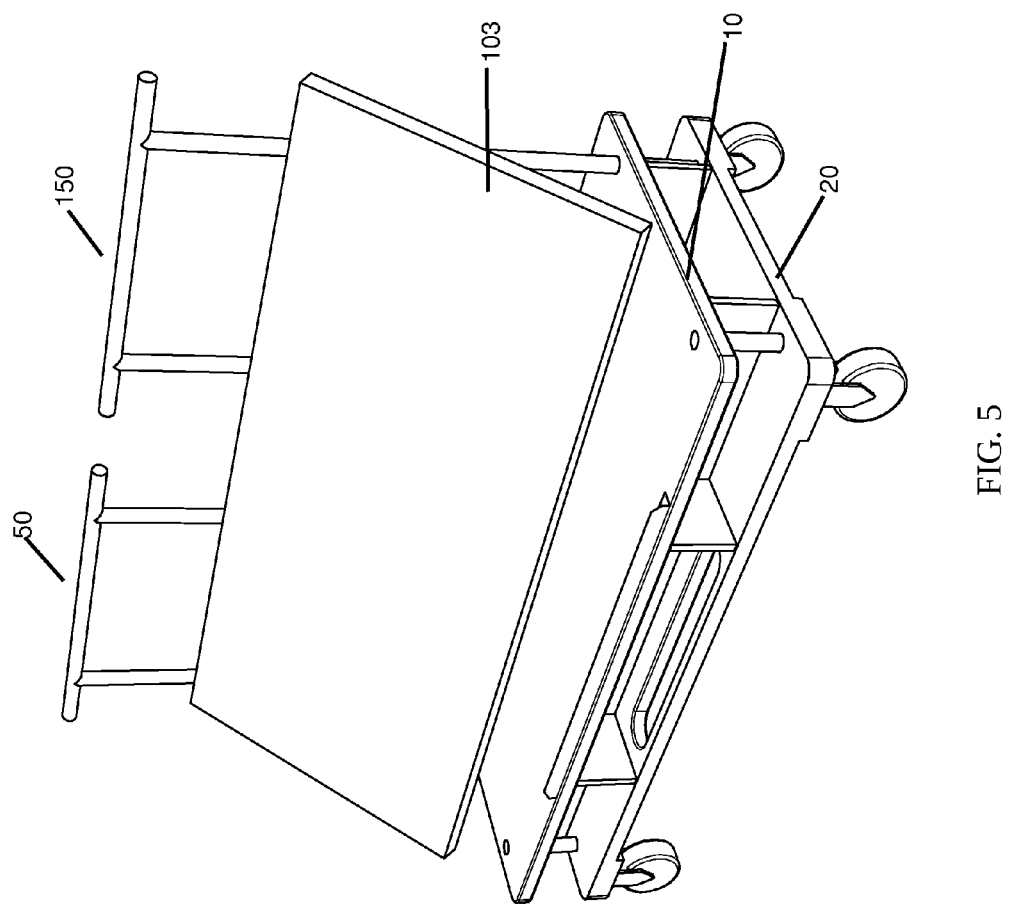
FIG. 5 shows the cart of FIG. 4 with an item against the two handles on the same side of the cart.

FIG. 5 shows the cart of FIG. 4, with an item against the two handles on the same side of the cart. This figure shows a board 103 placed against the top surface of the upper generally flat elongated member 10, as well as against both handles 50 and 150.

Figure 6:
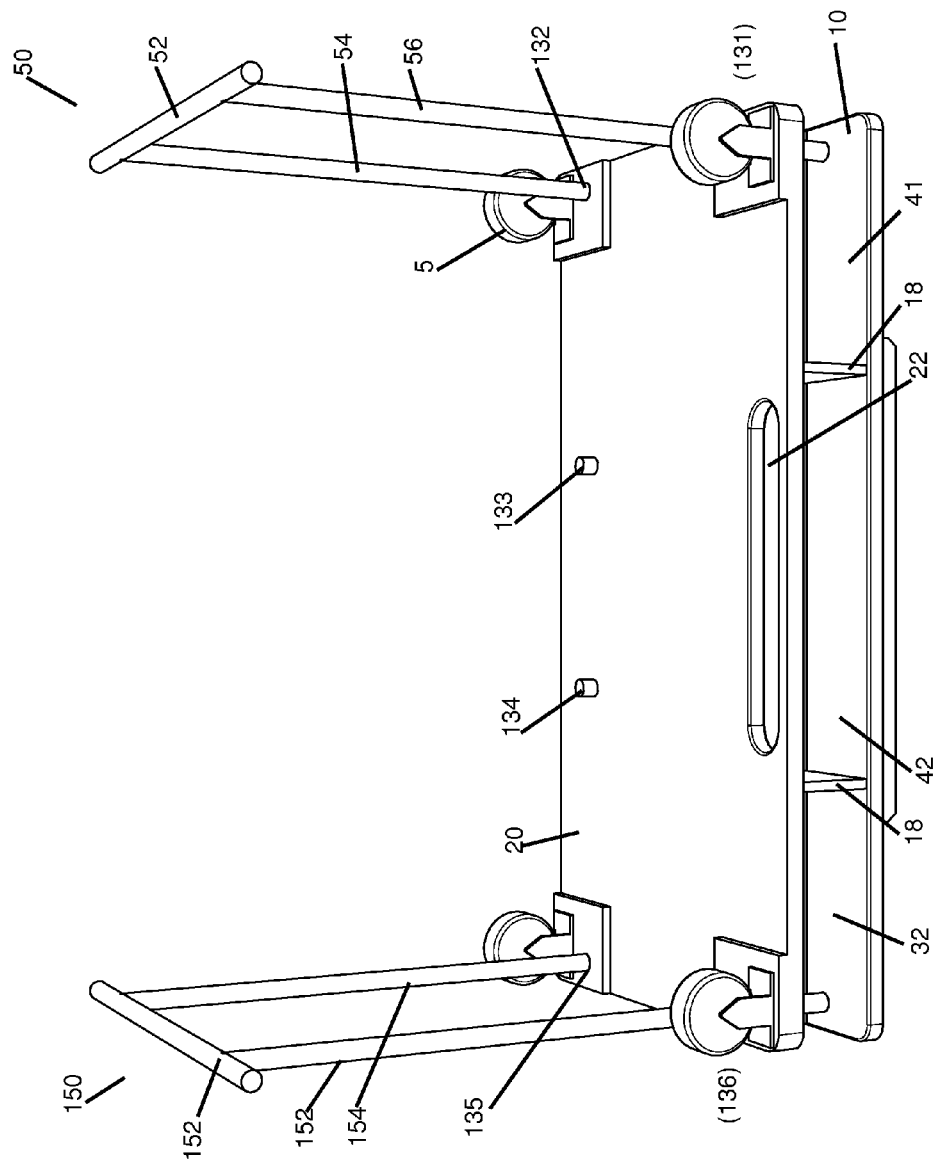
FIG. 6 shows a cart of an embodiment of the disclosed technology, with handles attached to an opposite side to form a table.

FIG. 6 shows a cart of an embodiment of the disclosed technology with handles attached to an opposite side to form a table. Here, the portals have been incremented by 100 but, in embodiments of the disclosed technology, they are actually the same portals as shown and described with reference to FIG. 5 and are connected there-to by way of respective hollow pipes 15. As such, the same descriptions of the portals 31-36 apply to the portals 131-136, with the exception that portals 131-136 describe an entrance into the bottom side of the lower generally planar member 20. The handles 50 and 150 can be placed through the portals from the bottom side (e.g., through portal 132 and then through portal 32), or from the top side (e.g., through portal 32 and then through portal 132) by way of passage through a hollow pipe 15, space, or cutout in the upper and/or lower generally flat members. With the handles passing through from the bottom side 20 to the top side 10, one can then flip the device over, placing the cross-beams on the ground and/or lower than the rest of the device, resulting in the desk of FIG. 7.

Figure 7:
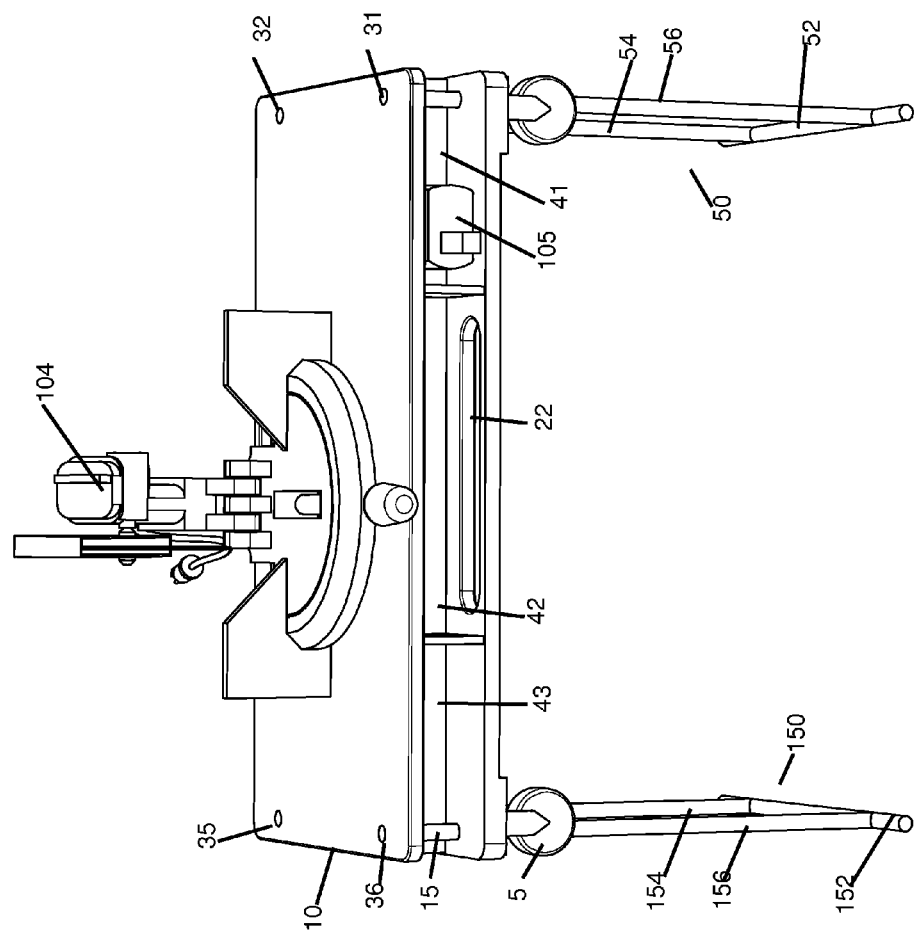
FIG. 7 shows the cart of FIG. 6 in a table formation.

FIG. 7 shows the cart of FIG. 6 in a table formation. Here, handles 50 and 150 are placed through the lower portals first, followed by the hollow pipes 15 and possibly the upper portals, and held in place by a mechanism described above. FIG. 7 shows the same cart/table of FIGS. 1-6, except that the cart/table is flipped, so that it is on the top and the handles are below. This allows the table to sit on handles 50 and 150, while the handles become the support legs of a table with a generally flat top 10 and bottom 20. A tool 104 can be placed on the table, while an outlet or other tool 105 can be placed in a shelf, such as shelf 41.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described hereinabove are also contemplated and within the scope of the invention.

I claim:

1. A cart/table comprising:
two spaced-apart parallel surfaces;
devices which connect said two spaced-apart parallel surfaces;
wheels adjacent to one of said two spaced-apart parallel surfaces;
a plurality of portals extending through said two spaced-apart parallel surfaces, each portal of said plurality of portals aligned with a pipe;
at least one handle with a cross-beam and two parallel support beams, said two parallel support beams spaced apart a distance equal to that of two portals of said plurality of portals and passing through said two portals wherein said wheels attached to one of said two spaced-apart parallel surfaces on a side opposite an adjacent side are situated between said two spaced-apart parallel surfaces.

2. The cart/table of claim 1, wherein said two spaced-apart parallel surfaces are rectangles of equal length and width to each other, and said plurality of portals extending through said two spaced-apart parallel surfaces is substantially at each corner of each rectangle, and an additional two portals of said plurality thereof are substantially along a longest length of said rectangle spaced apart from said corners.

3. The cart/table of claim 2, wherein said at least one handle is two handles, each having:
a support beam of said two parallel support beams passing through a portal of said plurality of portals substantially at a corner of each said rectangle;
support beam of said two parallel support beams passing through a portal of said plurality of portals at one of said additional two portals of said plurality thereof.

4. The cart/table of claim 2, wherein said at least one handle is two handles oriented in a same direction to one another, and each said two parallel support beams of each said two handles passing through a portal of said plurality of portals substantially at a corner of each said corner of each said rectangle.

5. The cart/table of claim 2, further comprising an elongated additional portal extending through each of said two spaced-apart parallel surfaces, wherein each of said two spaced-apart parallel surfaces is of equal length and width to each other, and each said elongated additional portal is centered along said length, each at an opposite side from another with respect to said width.

6. The cart/table of claim 1, wherein said two parallel support beams of said at least one handle extend from said one of said two spaced apart parallel surfaces, where said wheels are attached and said cross-beam is parallel to said two spaced-apart parallel surfaces.

7. The cart/table of claim 1, wherein said two parallel support beams of said at least one handle extend from said one of said two spaced-apart parallel surfaces facing said wheels, and said cross-beam is parallel to said two spaced-apart parallel surfaces.

8. A kit comprising a top rectangular member, a bottom rectangular member, and a handle, such that:
said top rectangular member and said bottom rectangular member are fixedly spaced apart and in parallel to one another, and at least one said rectangular member comprises a plurality of spaced-apart portals at each corner, a distance along a shorter side of said at least one rectangular member between two of said plurality of spaced-apart portals being an equal distance from at least two portals of said plurality of spaced apart-portals at a corner of at least two additional portals of said plurality of portals at non-corners;
at least one rigidly formed handle having spaced-apart supports equal to said distance, such that said spaced-apart supports of said handle are insertable into two portals of said plurality of spaced-apart portals in at least four different ways.

9. The kit of claim 8, wherein both said top rectangular member and said bottom rectangular member comprise said plurality of spaced apart portals, such that said spaced-apart supports are insertable into two portals of said plurality of spaced-apart portals in at least eight ways, four of said at least eight ways being in an opposite direction compared to another four of said at least eight ways.

10. The kit of claim 9, wherein said spaced-apart portals extend through said top rectangular member and said bottom rectangular member.

11. The kit of claim 10, wherein hollow pipes surround an area between each set of two corresponding portals of said top rectangular member and said bottom rectangular member.

12. The kit of claim 11, further comprising a wheel at each corner of said bottom rectangular member, each closer to a corner of said bottom rectangular member than a portal of said plurality of spaced-apart portals at each corner.

13. A multi-configurable desk and cart comprising:
six portals each, wherein groups of three said six portals are spaced apart from at least one other portal at a first distance, each portal of said six portals passing through two spaced-apart elongated and generally flat members and a tube positioned between each of said two spaced-apart elongated and generally flat members;
at least a first handle with a cross-beam and two spaced-apart support beams, such that ends of each said two spaced-apart support beams are spaced apart at said first distance, and each end of said ends is removably insertable into one of said six portals.

14. The multi-configurable desk and cart of claim 13, wherein said ends are inserted into a first set of two adjacent portals.

15. The multi-configurable desk and cart of claim 14, wherein said first set of two adjacent portals is at a first shorter side of said generally flat members.

16. The multi-configurable desk and cart of claim 15, further comprising a second said handle, inserted into a second set of two adjacent portals at a second shorter side of said generally flat members, such that said first handle and said second handle are parallel to one another.

17. The multi-configurable desk and cart of claim 14, wherein said two adjacent portals are on a longer side of said generally flat members, and a second said handle is inserted into two additional adjacent portals of a different said group of three portals of said six portals than said first handle.

18. The multiple configurable desk and cart of claim 14, wherein said first handle is insertable into a first set of two adjacent portals in four different ways, each of said four different ways being 180 degrees rotated or flipped from one another.

19. The multiple configurable desk and cart of claim 13, wherein said at least one handle is two identical handles placed into four of said six portals, such that an identical portal cannot be placed into a remaining two of said six portals.

* * * * *